United States Patent
Chen (10) Patent No.: US 7,327,855 B1
(45) Date of Patent: Feb. 5, 2008

(54) VISION-BASED HIGHWAY OVERHEAD STRUCTURE DETECTION SYSTEM

(75) Inventor: Yang Chen, Westlake Village, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 11/350,570

(22) Filed: Feb. 9, 2006

Related U.S. Application Data (63) Continuation of application No. 09/886,931, filed on Jun. 20, 2001, now Pat. No. 7,027,615.

(51) Int. Cl.
*G06K 9/00* (2006.01)
(52) U.S. Cl. .................................... 382/104
(58) Field of Classification Search ................ 382/103, 382/104, 107; 701/96
See application file for complete search history.

(56) References Cited

U.S. PATENT DOCUMENTS

| | | | |
|---|---|---|---|
| 5,467,284 A | 11/1995 | Yoshioka et al. | |
| 6,037,860 A | 3/2000 | Zander et al. | |
| 6,246,961 B1 | 6/2001 | Sasaki et al. | |
| 6,311,123 B1 * | 10/2001 | Nakamura et al. | 701/96 |
| 6,670,912 B2 * | 12/2003 | Honda | 342/70 |

FOREIGN PATENT DOCUMENTS

WO  WO 97/21982   6/1997

OTHER PUBLICATIONS

Masaki, "Machine-vision systems for intelligent transportation systems," IEEE Intelligent Systems, Nov.-Dec. 1998, pp. 24-31.
L. Priese, et al., "Ideogram Identification in a realtime traffic sign recognition," Proc. 1995, IEEE Intelligent Vehicles Symp., IEEE Press., 1995, pp. 310-314.
P. Parodi, et al., "A feature-based recognition scheme for traffic scenes," Proc. 1995 IEEE Intelligent Vehicle Symp., IEEE Press., 1995, pp. 229-234.
P.H. Batavia, et al., "Overtaking vehicle detection using implicit optical flow," Proc. of IEEE Conf. on ITS, Boston, MA, Nov. 1997.
E. Young, et al., "Improved obstacle detection by sensor fusion," IEEE Colloquium on Prometheus and Drive, IEEE, London, GB, Oct. 15, 1992, pp. 2-1-2-6, XP000647205.

\* cited by examiner

*Primary Examiner*—Matthew C. Bella
*Assistant Examiner*—Tom Y Lu
(74) *Attorney, Agent, or Firm*—Tope-McKay & Associates

(57) ABSTRACT

An image sequence is inputted from a camera and vertical motion is estimated. A windowed horizontal edge-projection is extracted from the inputted image sequence and corresponding horizontal edges are projected. The horizontal edge-projection and the vertical motion estimation are combined in a horizontal segmentation and tracking element, and are forwarded to an object parameter estimation element, where the object's distance and height are estimated. This data is combined in a fusion with a radar detection element. By correctly matching the overhead objects sensed by the radar detection element and the video camera, the proximity and relative speed can be ascertained. Once overhead objects have been identified they can be isolated and not considered for collision avoidance purposes.

10 Claims, 12 Drawing Sheets

VISION-BASED HIGHWAY OVERHEAD STRUCTURE DETECTION SYSTEM

CROSS-REFERENCE TO RELATED APPLICATIONS

This application is a continuation of U.S. application Ser. No. 09/886,931, filed with the United States Patent and Trademark Office on Jun. 20, 2001, now U.S. Pat. No. 7,027,615, and titled "Vision-Based Highway Overhead Structure Detection System."

TECHNICAL FIELD

This invention relates generally to a detection system and more specifically to an apparatus and method for detecting objects in a motor vehicle environment.

BACKGROUND OF THE INVENTION

There has been notable progress in the development of fully autonomous automobiles capable of navigating through traffic without human intervention. For example, systems may use sensing technology to warn drivers of impending collisions, or even take control of a vehicle in certain situations where the driver either ignores or cannot heed a warning. While the autonomous vehicle will probably exist at some time, existing vehicle systems still have many challenges to overcome in order to be practical.

Some collision warning systems use a radar-based detector, combined with a vision-based land-sensing module, to detect and track vehicles ahead of the host vehicle. The radar-based system monitors the moving pattern of all objects tracked by the radar sensor to determine potential threats along the host's path. The host's path is provided by the lane module. The radar sensor has a limitation in that it not only detects moving and stationary vehicles, but also many fixed roadway infrastructures, such as overpasses and overhead signs. A collision warning system that provides frequent false alarms can be a nuisance rather than a help to drivers.

Typical radar sensors are designed to have a small vertical field of view (VFOV) ~5 degrees in an effort to avoid detection of overhead objects. Even at a maximum detection range of 120 meters, some overhead objects are still routinely detected. There are a number of possible explanations for the false alarms, including, misalignment of the radar axis relative to the ground, often as a result of the radar transmitter being aimed too high. Other factors include ground reflections, which can create "ghosting." Additional possible sources of error include radar side lobes, and certain types of terrain. The terrain-based error sources can occur because overhead objects may actually be within the vertical field of view due to the slope of the road. Therefore redesigning a radar sensor to provide a narrower vertical beam will not likely be successful in solving the problem completely. Additionally, many of these solutions could result in a less robust system that might miss actual obstructions and may still generate false alarms. Therefore there is a need for a robust system that effectively warns users when there is a potential for collision and simultaneously minimizes or eliminates the number of false alarms.

SUMMARY OF THE INVENTION

The present invention provides a robust method and apparatus that effectively warns users when there is a potential for collision and simultaneously minimizes or eliminates the number of false alarms. The embodiments described herein relate to a vision-based identification system that can be used for the reduction of false radar sensor alarms, preferably due to overhead objects. The identification system utilizes an image collection device mounted in a vehicle to supply an image processor with images of objects ahead of the vehicle. The image processor analyzes the images and extracts horizontal edges from each frame. These edges are then tracked through successive image frames by taking into account both the vertical and the forward motion of the vehicle. The distance and height of the horizontal edges from the vehicle are determined and tracked. The tracked horizontal edges are subsequently supplied to a radar sensor processor. When the data from the image processor is matched with the data from the radar sensor processor, false alarms that would be generated by these overhead objects can be avoided.

One embodiment of the invention includes an apparatus and method for reducing the incidence of vehicle collisions. The embodiment provides an image capture device, such as a video camera, an image processor, a radar transceiver, and a radar signal processor. In this embodiment the image capture device is configured to provide a video signal to the image signal processor. The radar transceiver is configured to provide input to the radar signal processor, and the image processor and radar signal processor are configured to provide input to a matching processor where the combined processed signals complement each other and allow the apparatus to effectively identify elements likely to result in false radar sensor alarms. By squelching the rate of false alarms, the effectiveness of vehicle collision avoidance systems is enhanced.

Another embodiment of the present invention expands on the embodiment just discussed. In this embodiment the image processor is configured to extract substantially horizontal edges from the image inputs in the form of edge pixels, and project the edge pixels in each row of the image signal inputs to get a horizontal edge-projection vector for each image. These horizontal edges represent bridges, overpasses, trucks, and other potential alarm triggering devices. In the discussed embodiment, the vision-based identification apparatus' horizontal edge-projection vector has a companion vector. The companion vector has definite distance traveled, since the beginning of the tracking of the horizontal edge-projection vector, and the companion vector may be computed by integrating speed over elapsed time, and the horizontal edge-projection vectors are sorted based on a plurality of factors, some of which may include the average magnitude of the horizontal edge-projection vectors, and the status of the horizontal edge-projection vector. The status of the horizontal edge-projection may be updating, which occurs when the horizontal edge is being tracked and updated. Alternatively the edge could be present but no longer updating. A third possibility is that the horizontal edge is new, or observed for the first time.

In another embodiment of the invention, wherein the tracking of horizontal edge-projection vectors is assisted by using one or both of the following, vertical motion compensation or forward motion compensation. The vertical motion compensation helps predict where the tracked horizontal edge-projection vectors will be located on successive image inputs by compensating for vertical motion. Similarly forward motion compensation helps predict where tracked horizontal edge-projection vectors will be located on successive image inputs by compensating for forward motion.

The forward motion compensation can be achieved by using a plurality of previous points from one or more previous images.

The typical embodiment will likely use a full motion video camera, which will be located in a motor vehicle and will face in the direction of the vehicle's motion. The image collection device will have its optical axis parallel to the ground and the camera may be configured to have a limited horizontal field of view.

BRIEF DESCRIPTION OF THE DRAWINGS

The objects, features, and advantages of the present invention will be apparent from the following detailed description of the preferred embodiment of the invention with references to the following drawings, where.

DETAILED DESCRIPTION

The present invention provides a method and apparatus for reducing the false alarm rate associated with vehicle collision warning systems. The invention augments radar-based collision warning systems, and is configured to reduce the false alarm rate associated with conventional systems' misidentification of overhead objects as collision threats. The following description, taken in conjunction with the referenced drawings, is presented to enable one of ordinary skill in the art to make and use the invention and to incorporate it in the context of particular applications. Various modifications, as well as a variety of uses in different applications, will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein. Furthermore, it should be noted that unless explicitly stated otherwise, the figures included herein are illustrated diagrammatically and without any specific scale, as they are provided as qualitative illustrations of the concept of the present invention.

Figure 1:
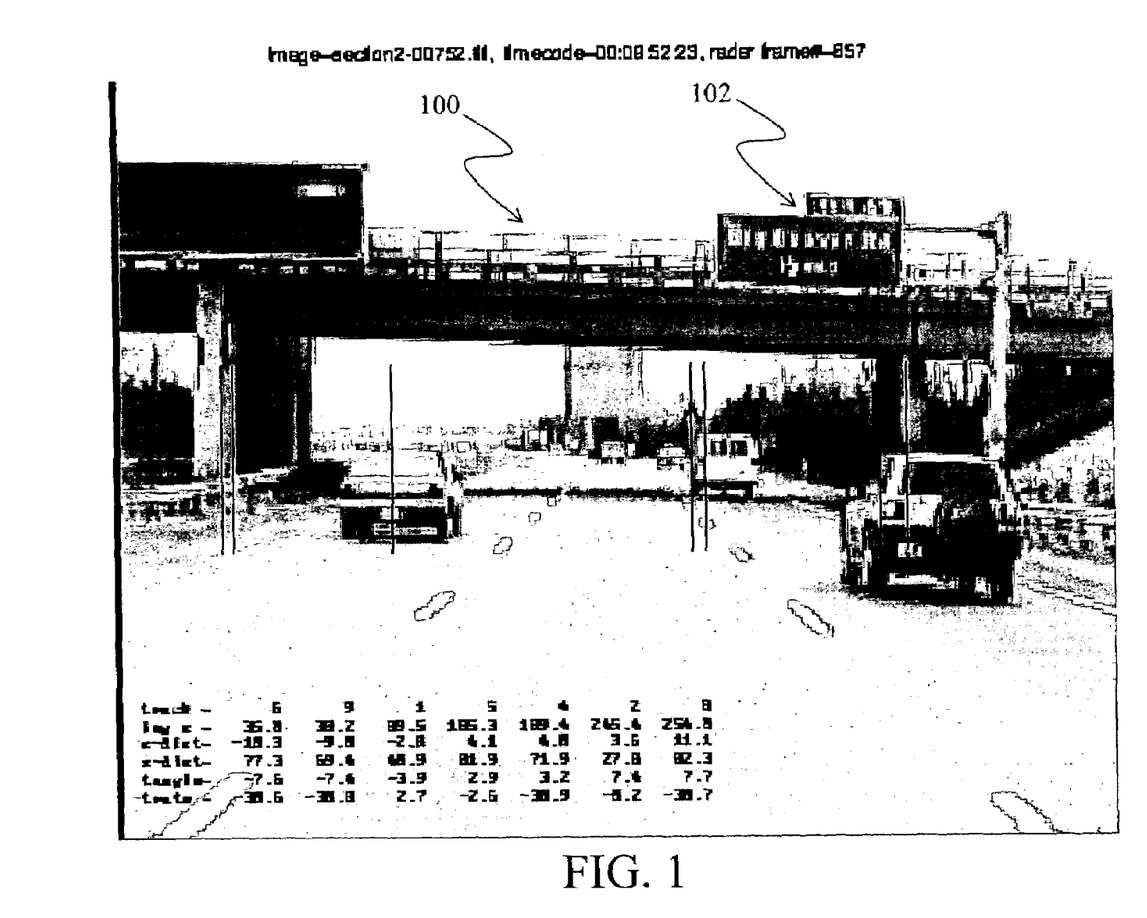
FIG. 1 is a photograph showing a freeway overpass with overhead signs.

The invention reduces the frequency of false radar alarms that result from overhead objects being mistaken for collision hazards. One embodiment of the present invention utilizes an in-vehicle video camera to capture video images. The captured images are then processed, and certain features are extracted. The extracted features correspond to stationary and overhead objects as shown in FIG. 1. The bridge 100 and sign 102 are both identified as overhead objects. The invention matches the bridge 100 and sign 102 to the input from a radar sensor that reports the position and relative motion of objects. When the matching operation is finished, the radar and video inputs of the bridge 100 and sign 102 are unified. By correctly matching the overhead objects sensed by the radar and video camera, the proximity, identity and relative speed can be ascertained. Once overhead objects have been identified they can be isolated, and are not considered for collision avoidance purposes; thus reducing the incidence of false alarms.

Two observations are made when analyzing images to determine if overhead objects are present. The first observation is that the overhead objects contain significant horizontal line segments. The second observation is that the horizontal line segments follow well-defined trajectories in a video image sequence. As the vehicle travels, the image of the horizontal line segments from an overhead object moves in a prescribed way determined by a plurality of factors including: the height of the corresponding overhead object, the distance from the host vehicle to the object, the speed of the host vehicle, and the camera set-up. These factors may serve as the invention's basis for detecting and tracking significant horizontal edges in captured video images. The invention utilizes tracked horizontal edges to estimate the distance(s) to and height(s) of the underlying overhead objects. From the distances and heights of the objects it is possible to determine if the tracked horizontal edges are due to an overhead object, and if the object is at a distance consistent with one or more radar reports of fixed objects.

One embodiment of the present invention utilizes horizontal edge-projections and estimates the overhead object's distance and height. The horizontal edge-projection is robust to noise in the edge-identification process, since it tolerates missing edge pixels. Using horizontal edge-projection also reduces the search space for feature matching from the original two-dimensional search down to a one-dimensional search. The resulting search is a simpler tracking algorithm, which allows for faster computation and requires fewer resources. The approach of the present invention requires no special hardware and can share the video output from a lane-sensing camera. Additionally it can share computational resources with other existing in-vehicle modules.

Figure 2:
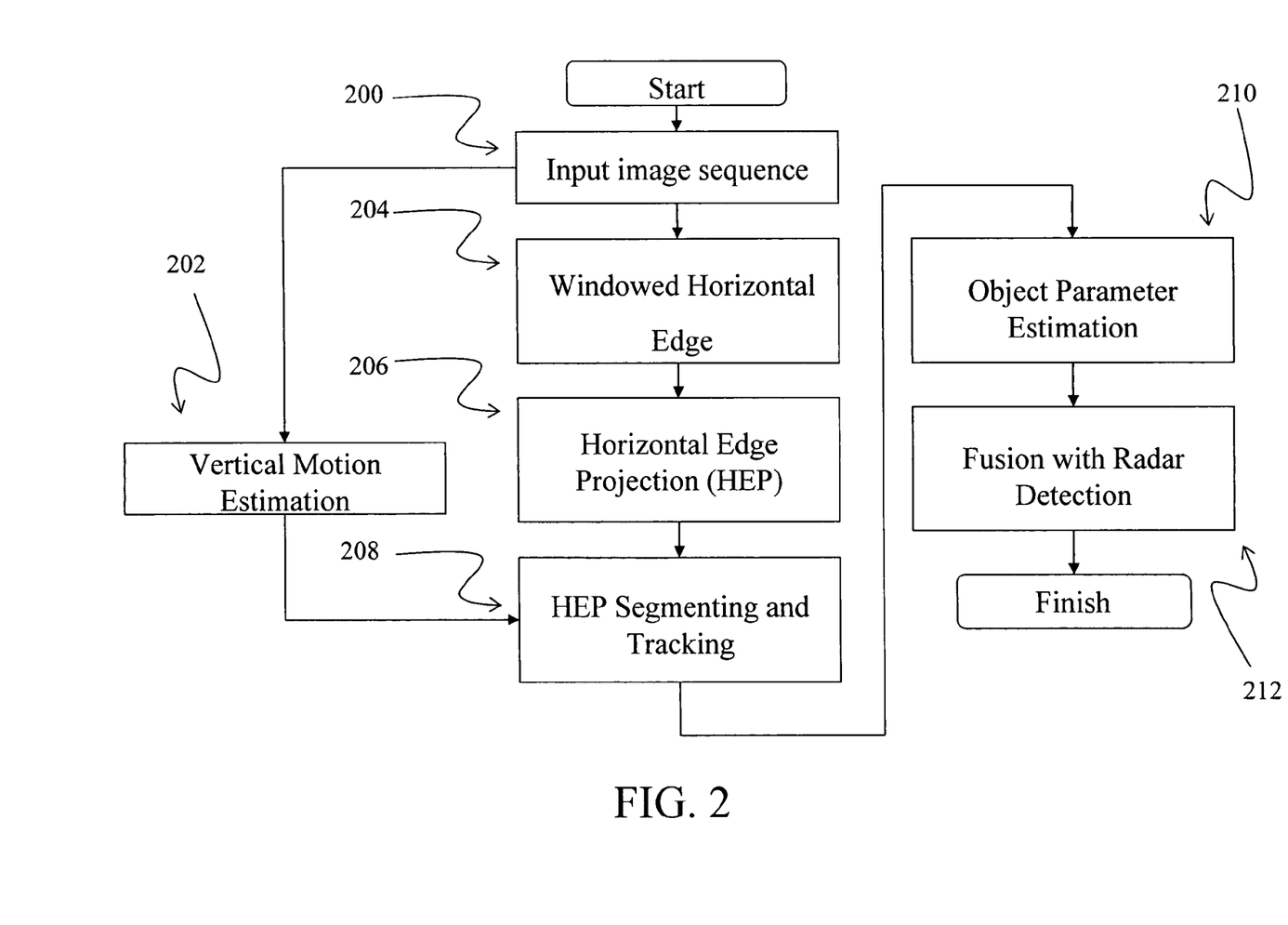
FIG. 2 is a flowchart depicting the overall overhead object determination method.

A flowchart of the method utilized in identifying overhead objects is presented in FIG. 2. An image sequence is inputted 200 from the camera and vertical motion is estimated 202. Windowed horizontal edges 204 are extracted from the inputted image sequence 200 and the horizontal edges are projected 206. The horizontal edge-projection (HEP) 206 and the vertical motion estimation 202 are combined in a HEP segmenting and tracking element 208 and forwarded to an object parameter estimation element 210 where the object's distance and height are estimated. This data is combined in a fusion with the radar detection element 212. By correctly matching the overhead objects sensed by the radar and video camera, the overhead objects can be identified, isolated, and ignored for collision avoidance purposes.

In another embodiment of the present invention, a vehicle is equipped with a video camera, optionally mounted at the rear-view mirror and pointing forward. The camera should be mounted along the vehicle's longitudinal axis, and have an optical axis parallel to the ground surface in which the vehicle travels. The acquisition of the images from the video camera should be at a full video rate of 30 frames/second, and provide the system with images of approximately 320 pixels wide by approximately 240 pixels high. However different capture rates and resolutions may be selected for specific applications.

Figure 3:
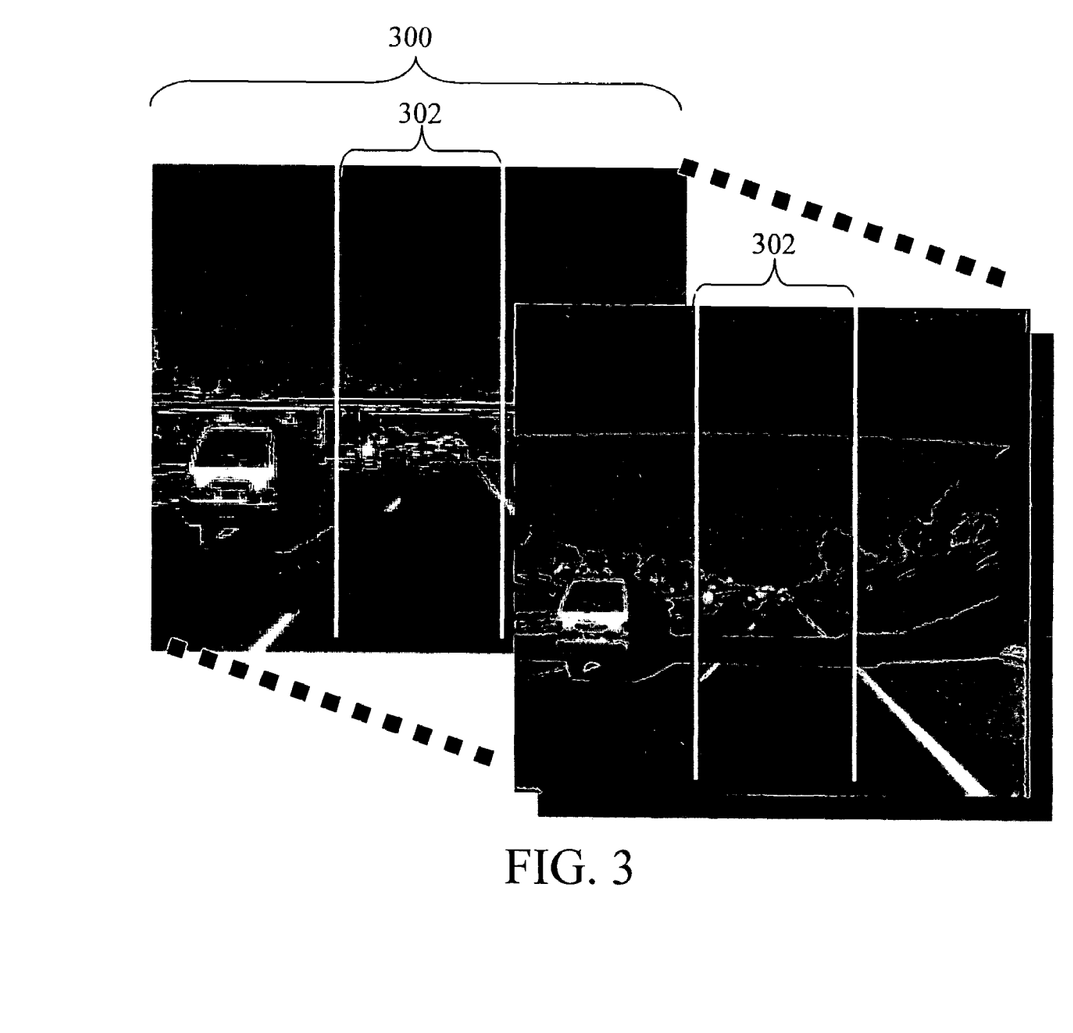
FIG. 3 is a photograph showing sample images from a video sequence, and showing the center windows selected for horizontal edge extraction.
Figure 4:
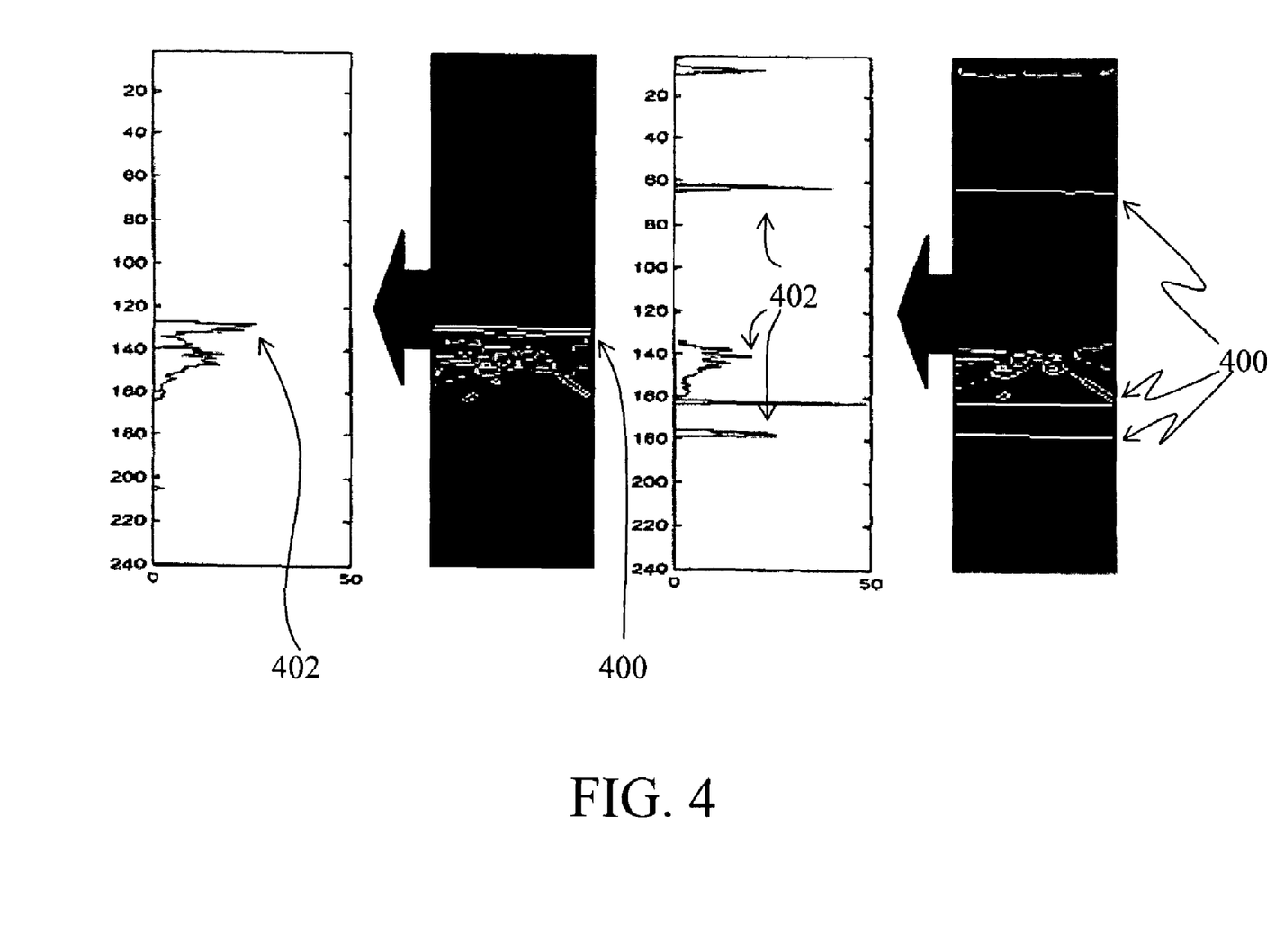
FIG. 4 is a depiction showing extracted horizontal edge images and their projections as graph plots from the image in FIG. 3.

In order to detect and track the overhead objects, a windowed horizontal edge-projection is constructed for each image in the image sequence. The procedure for horizontal edge-projection construction includes the following steps:

1. An image is received from a camera as illustrated in FIG. 3. The image 300 is separated into a plurality of windows. The center window 302 is isolated and tracked.
2. In FIG. 4 the horizontal edges 400 are extracted from the image window.
3. The edge pixels are then projected in each row of the image window by counting the number of edge pixels in that row to get a horizontal edge-projection vector 402.

In step 1 above, the window can optionally be shifted off-center to more precisely provide relevant information regarding the vehicle's anticipated trajectory. The shifting protocol may rely on lane tracking technology, vehicle yaw rate, or other factors. Further, in step 2 above, the edge gradient in the vertical direction can be computed and then projected.

Figure 5:
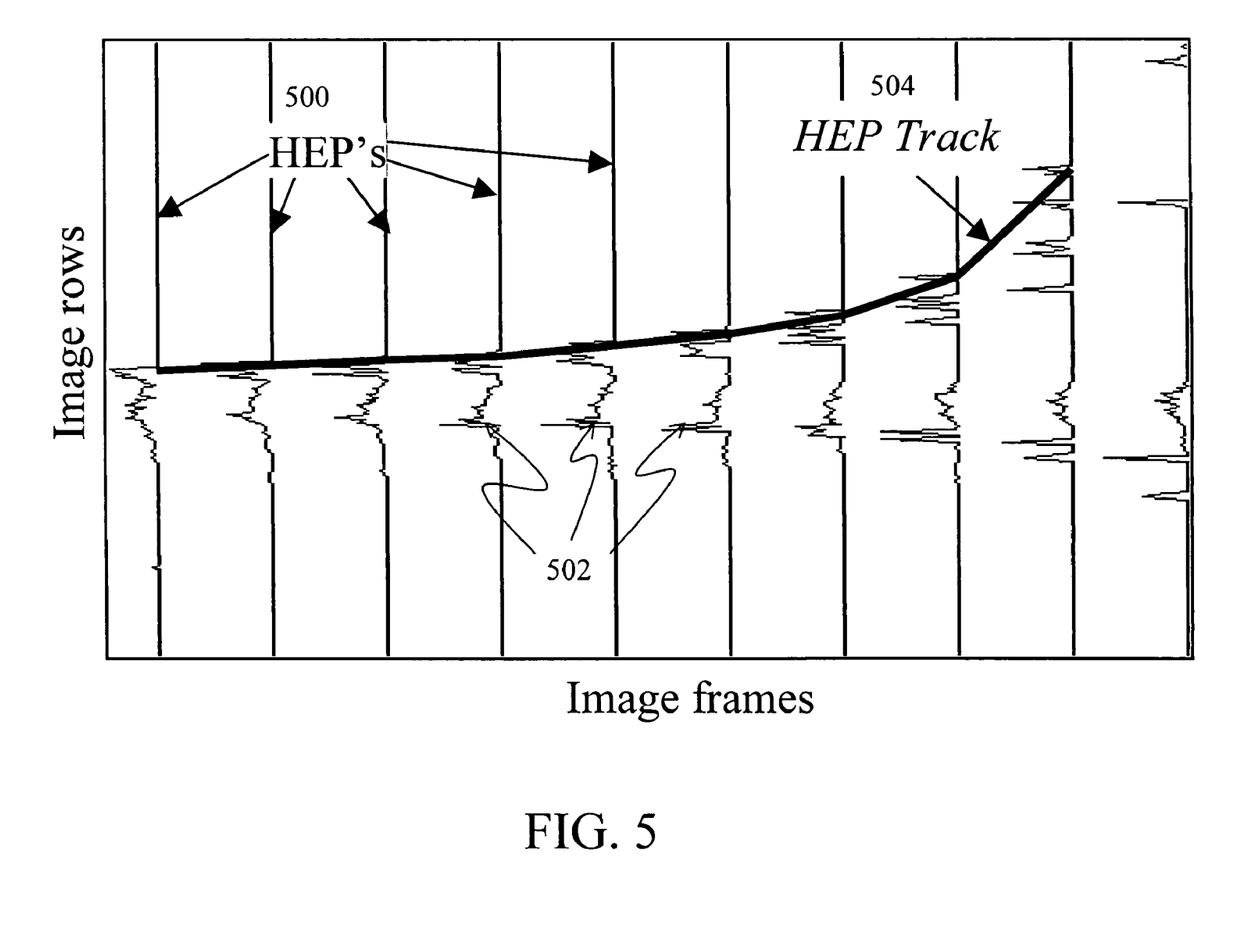
FIG. 5 is a graphical example of a sequence of horizontal edge-projections with the track for a horizontal edge traced.

In FIG. 5 a sequence of horizontal edge-projections 500 are shown as graph plots adjoined in the order of the image sequence. The peaks 502 in the horizontal edge-projection represent the horizon line segments, and the trajectories of the peaks form horizontal edge-projection tracks 504. The rationale for using the projection 500 of the horizontal edges is that it makes tracking the edges 504 easier. The projection reduces the tracking search space from two-dimensions to one-dimension. Additionally, the projections 500 will also be more robust than the edge segments since the projections 500 will tolerate missing edge pixels. Furthermore, the projection operation is much simpler than linking the edge pixels into edge segments and further fitting into line segments, which is a necessary step for tracking when working in two-dimensions.

The fundamental assumption for using horizontal edge-projection as a representation for overhead object identification is that the edges are horizontal. This is mostly true, but occasionally the horizontal edges of the overhead objects can be slightly tilted, or the overhead object may be slightly curved. This results in a reduction of the horizontal edge-projection peaks relative the noise floor because the edge pixels from a single tilted line segment cover more than one image row. Therefore they contribute to multiple elements of the horizontal edge-projection. To alleviate this problem a horizontally-centered window 300 of the image as shown in FIG. 3 is used for edge extraction as in FIG. 4. Windowing reduces the extent of the line segments being projected 400 into the horizontal edge-projection 402, thereby reducing the footprint of a tilted line in the horizontal edge-projection so that individual peaks are still separable. Two other benefits of windowing should also be noted. The first is the elimination of background noise in horizontal edge-projection from the roadside clutter. The second is the reduction in computation resources that are required. Possible extensions to this approach include orienting the projection in which the edge pixels are projected to include not only the direction parallel to the image rows, but also directions at several pre-set angles to the image rows. These directions can be determined via experiments or by calculating the expected tilt angle of the horizontal line segments of commonly observed overhead objects.

The width of the image window 300 is currently set at about 50 pixels. In addition, the window 300 can be adjusted either left or right based on the vehicle heading if lane information is provided, or if the position of the steering wheel is provided. When using such an adjusted window the system can concentrate on the portion of the image in the path of the host vehicle.

Figure 6:
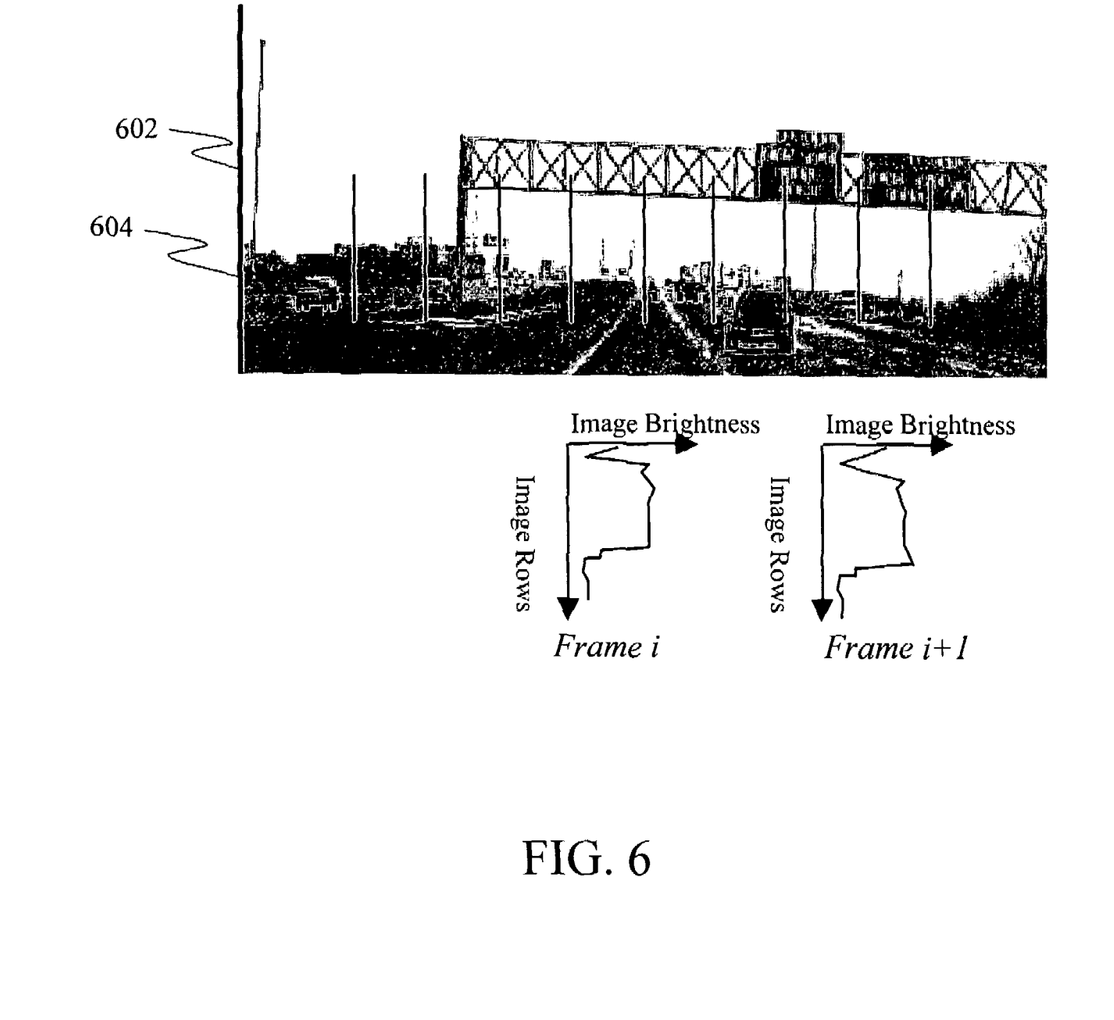
FIG. 6 is an illustration of vertical motion estimation using a one-dimensional optical flow method.

Vertical motion of the image can lead to tracking difficulty and therefore must be considered. Ideally the image's vertical motion can be compensated for using either conventional approaches or those described herein. The vertical motion in the image can be caused by the vehicle traveling on an uneven road. Such a road may cause the camera to move somewhat randomly in the vertical direction. The result of this image motion is significant, in that it will adversely affect the accuracy of an object parameter estimation algorithm. The vertical image motion estimation is based on a one-dimensional optical flow concept. A number of equally spaced vertical slices from each image are taken. In one embodiment, 10 slices are taken at columns 96, 112, 128, 144, 160, 192, 208, and 224 for the image size of 240 rows by 320 columns. The vertical motion of the images is then analyzed by developing a one-dimensional optical flow of the image intensity profile for each slice across consecutive image frames, as shown in FIG. 6. The one-dimensional optical flow between two consecutive image frames is summarized as follows:

1. Find the one-dimensional edge of slice j for image frame i and i+1 by convoluting them with a kernel of [1, 1, 0, −1, −1];
2. Find the minimum (negative extreme) 602 of the one-dimensional edge of slice j for image i and record its location as g(j, i) (image row number); and
3. Find the minimum (negative extreme) 604 of the one-dimensional edge of slice j for image i+1 within a window of 3 pixels of g(j, i) (i.e., [−1, 1] of g(j, i)) and record this location as g(j, i+1). The relative movement of the image from frame i to i+1 at slide j is equal to (g(j, i+1)−g(j, i)).

Figure 7:
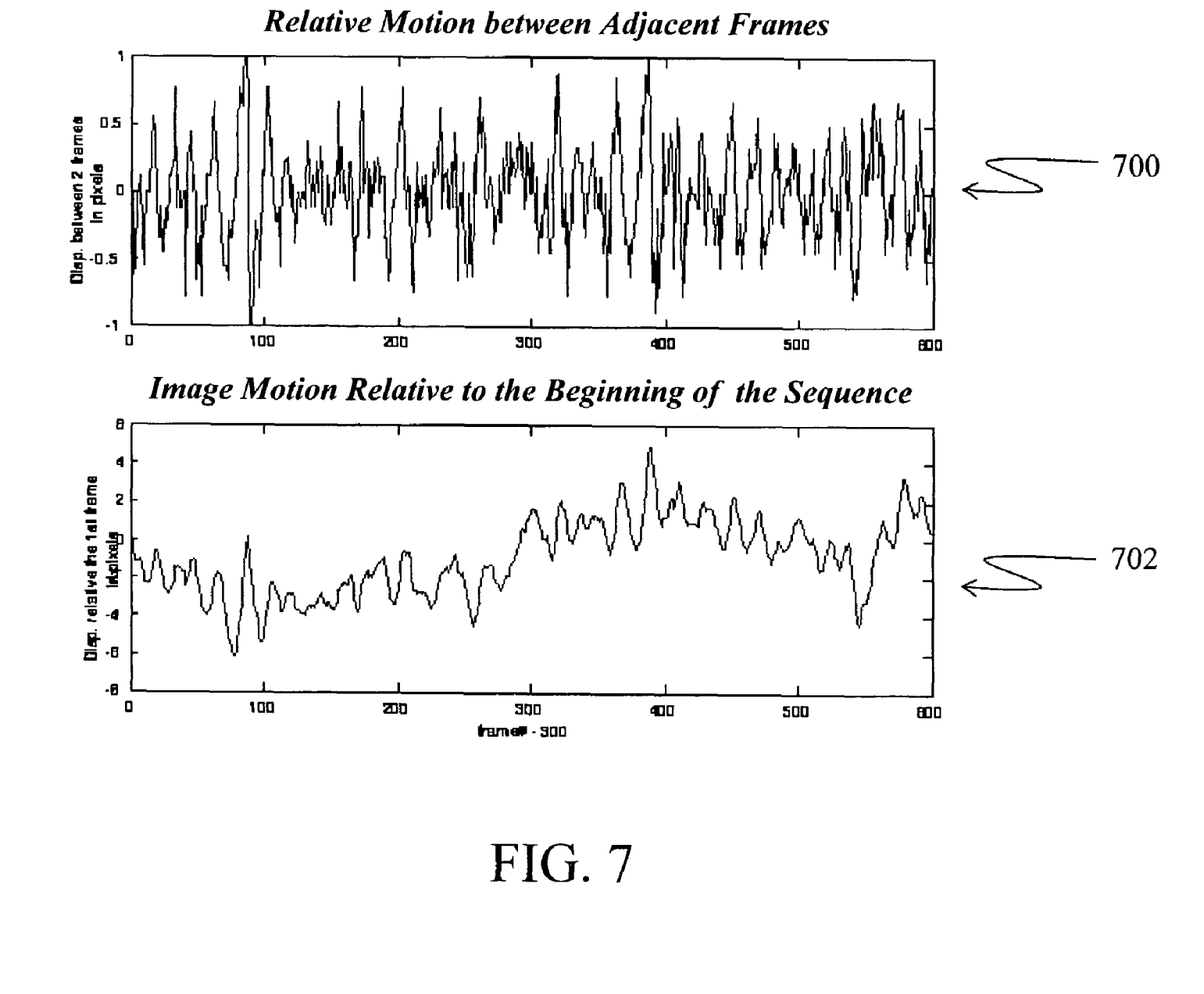
FIG. 7 is a graphical depiction of examples of vertical image motion estimation.

When the motion estimates from all slices are received, the motion between the two image frames is computed as the average of the motion from all image slices. The minimum 600 of the one-dimensional edge filter corresponds to the real horizon. The real horizon is the transition between the sky 602 (bright) and the land 604 (dark). The real horizon is a very reliable feature to track for motion estimation. To make the system more robust, only rows 96 to 130 of each slice are used for the one-dimensional optical flow analysis. These rows correspond to the region where the horizon is likely to occur. If the system fails to find a match in step 3 above, the estimate for that slice is excluded from the averaging computation at the end. FIG. 7 shows an example of the estimated motion from an image sequence. Plot 700 shows the motion between the adjacent image frames, and plot 702 shows the relative displacement of the images relative to the first frame of the sequence.

Figure 8A:
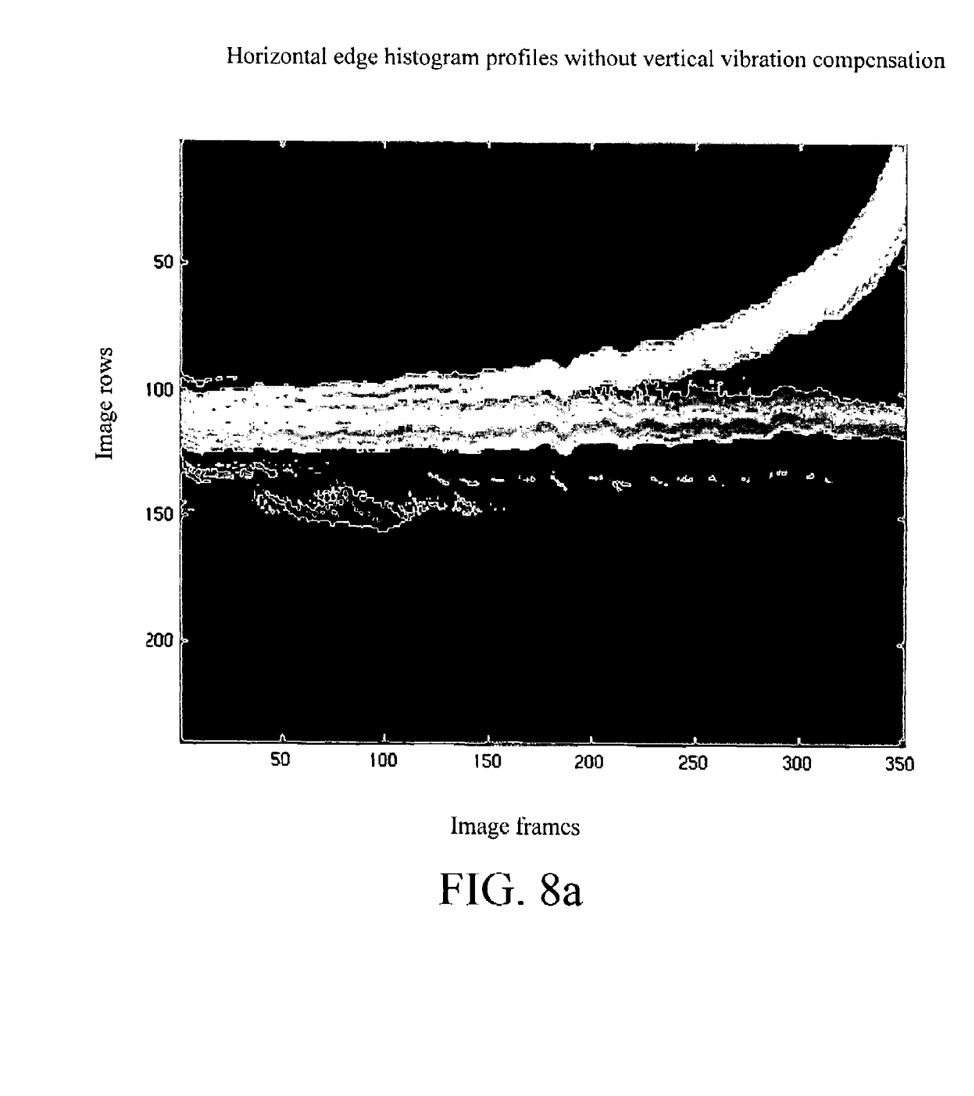
FIG. 8a is a graphical depiction of a sample horizontal edge-projection map.
Figure 8B:
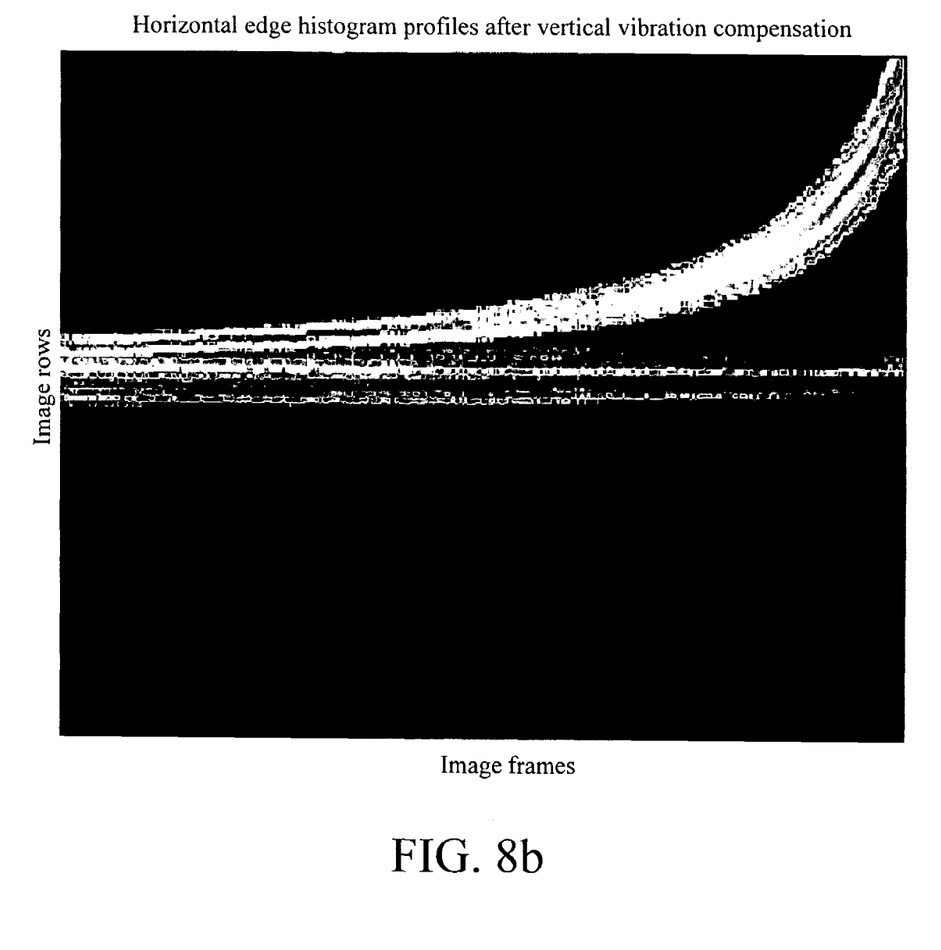
FIG. 8b is the horizontal edge-projection map shown in FIG. 8a after vertical motion compensation.
Figure 8C:
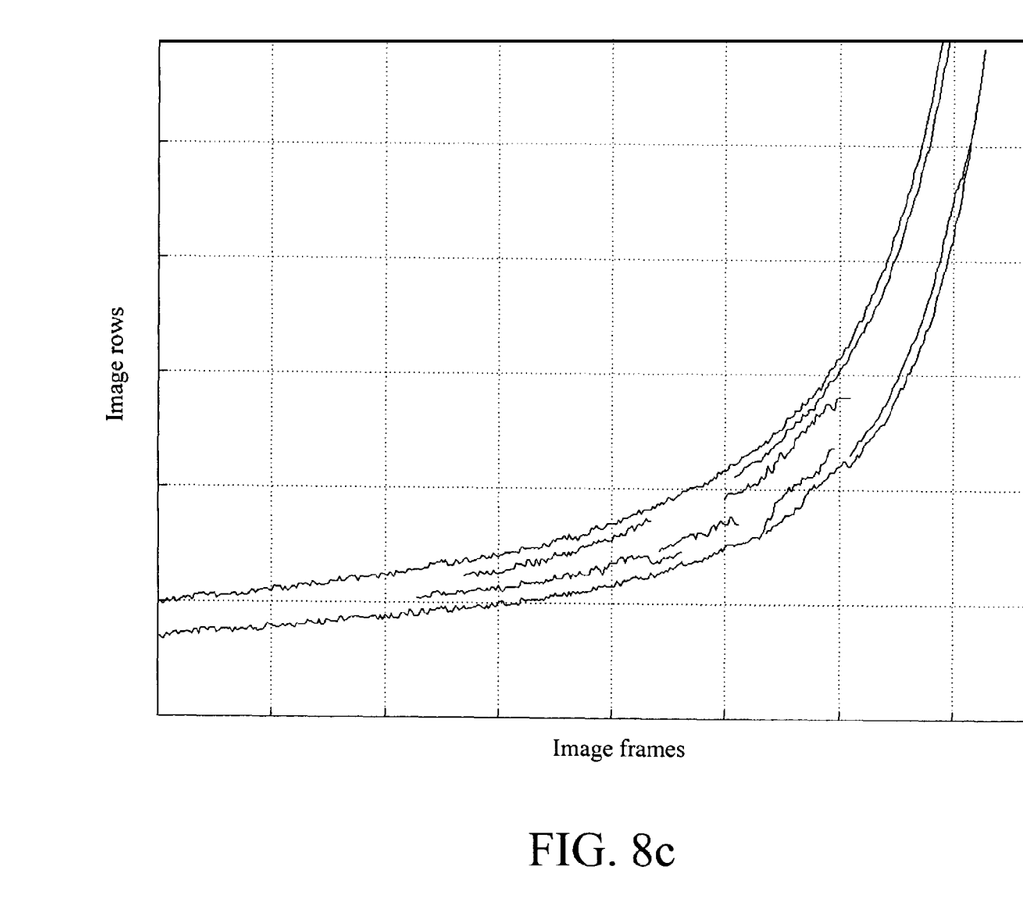
FIG. 8c is a graphical representation showing the horizontal edge-projection tracks extracted from the horizontal edge-projection map corresponding to the horizontal projection map shown in FIG. 8b.

The waving pattern of the horizontal edge-projection map in FIG. 8a is due to the vertical motion of the image. FIG. 8b show examples of horizontal edge-projection maps with vertical motion compensation, and FIG. 8c shows the horizontal edge-projection tracks corresponding to the motion compensated horizontal edge-projection map of FIG. 8b. Significant horizontal edges representing the top and bottom of the overhead objects have been tracked from the beginning of the sequence in FIG. 8c.

Due to the effect of averaging, the motion computed using the technique presented above has a higher resolution than the pixel resolution of the image. This makes it possible to achieve sub-pixel resolution in horizontal edge-projection tracking, and helps reduce the image quantization effects associated with the horizontal edge-projection, which is important in the estimation of the object parameters.

The purpose of horizontal edge-projection tracking in FIG. 8c is to describe quantitatively the location of horizontal edges present in a horizontal edge-projection sequence 500. A horizontal edge-projection track 504 is a sequence of points corresponding to a single horizontal edge in the horizontal edge-projection 500. The location of the track points and the vehicle position form the basis for distance and height estimation of the overhead objects. The task of horizontal edge-projection tracking includes segmentation and tracking. Segmentation is to identify the peak locations in the horizontal edge-projection, which correspond to significant horizontal edges. This is done by thresholding the horizontal edge-projection and locating the local maximum of the result. Tracking is the association of the segmented horizontal edge-projections from one frame to the next.

Figure 9:
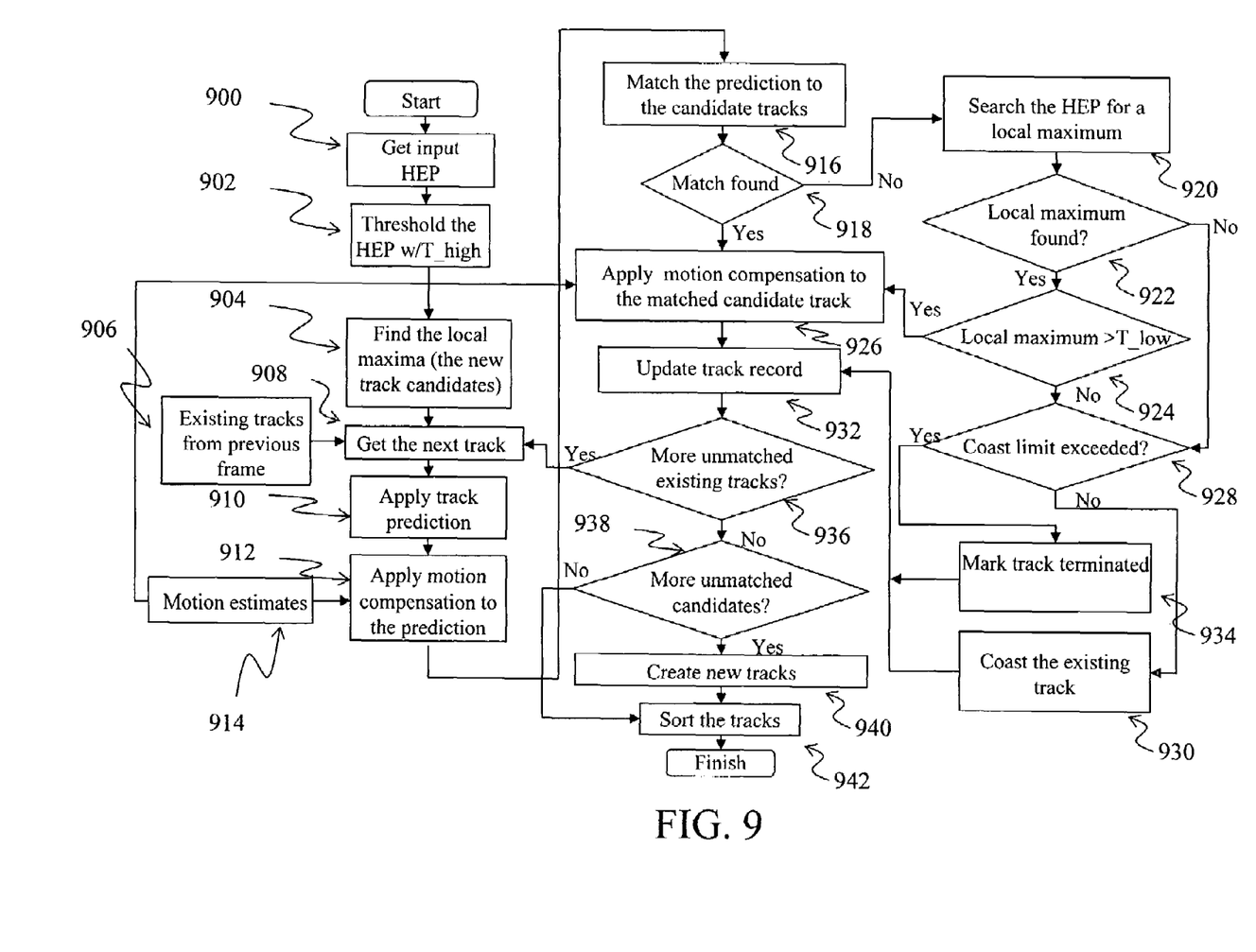
FIG. 9 is a flowchart depicting the horizontal edge-projection tracking method.

The flowchart used in horizontal edge-projection tracking, shown in FIG. 9, illustrates how a set of existing tracks is extended from one frame to the next. The horizontal edge-projection tracks, or tracked horizontal edge-projections, are built by executing the steps frame after frame as new images are captured. The process begins with a horizontal edge-projection input 900. Each horizontal edge-projection comes as a vector containing non-negative numbers indexed by the image row number. The next element thresholds the horizontal edge-projection with T_high 902 (in this example T_high=15). The horizontal edge-projection and the vector elements with smaller values than the threshold value are set to zero. The rest are left unchanged. The local maximum 904 is found, a point in the vector value that is larger than those held by both neighbors of the element in the resulting vector. The resulting local maximum 904 becomes the track candidates for new and continuing horizontal edge-projection tracks.

The threshold is currently set empirically, and its value should be related to the width of the window 300 used for constructing the horizontal edge-projection (in this example 50 pixels). Since the maximum value of T_high cannot exceed the window width, T_high acts as a threshold. There is a complementary threshold called T_low (in this example T_low=10), which is the lower limit allowed for a current track's horizontal edge-projection value below which the track can be terminated. This arrangement is the same as the hysteresis approach used in many edge-identification methods. Once the horizontal edge-projection segmentation for the current frame is completed, existing tracks can be extended to the current frame by matching. Before an existing track from a previous frame 906 can be matched to the next track candidates 904, track prediction 910 and motion compensation 912 are carried out. Track prediction 910 uses the history, up to the last frame of the current track, to predict the location of the track in the current frame. Motion compensation 912 corrects the predicted location by incorporating the estimated vertical motion 914 for the current frame. These steps are important for obtaining accurate tracks from the horizontal edge-projections. The absolute change in location of a horizontal line between two consecutive frames due to image vertical motion can be up to 1 pixel, and the horizontal lines in the image can be as close together as 2 pixels, separated by one pixel. Therefore accurate track prediction 910 and motion compensation 912 are required. Otherwise, track crossing will occur which will adversely affect the height and distance estimation. The track prediction method 910 uses a linear predictor. Ten previous points, on the track immediately before the current frame, are used and a line using a least-squares method is fitted. The track prediction 910 is computed using extrapolation based on the fitted line. Alternative predictors can also be used, such as an imaging model-based method.

Motion compensation 912 applies the estimated vertical motion 914 to the predicted track location 910 to further improve the prediction. Note that both the predicted track location 910 and the motion estimate 914 are in floating-point format; therefore accuracy is not lost in this process. This approach is preferred to performing motion compensation 912 on the horizontal edge-projection, which would cause the loss of the sub-pixel resolution potential of the new track point. When a match is found, the motion estimate will be applied to the new track point. This will allow the sub-pixel resolution potential to exist in the resulting track.

The predicted track location is matched to the candidate tracks 916. Track matching refers to the association of an existing track to one of the track candidates in the current horizontal edge-projection. If a match is found 918 then motion compensation is applied to the matched candidate track 926. If no match is found the horizontal edge-projection is searched for a local maximum 920. There are two phases of matching, the first phase is the matching to the segmented horizontal edge-projection, and the second phase is to the original horizontal edge-projection 900. The segmented horizontal edge-projection represents the local maximum in the horizontal edge-projection input 900 with values exceeding the high threshold. Matching the segmented horizontal edge-projection is the first attempt at finding the continuation of a current track. This matching is done by searching the predicted location of a current track in the segmented horizontal edge-projection after the motion compensation is applied 912. If this matching 918 fails, the horizontal edge-projection is searched for a local maximum 920. The local maximum 920 is searched for in the same search window as the one in the first phase, both in location and window size. If a local maximum 922 is found and the value of the horizontal edge-projection at the location exceeds T_low 924, it is declared that a match is found and motion compensation is applied to the matched candidate track 926. If no match is found for a current track in either the segmented horizontal edge-projection or the original horizontal edge-projection, the track will be allowed to coast for a pre-specified number of frames. If the coast limit is exceeded 928 the track is terminated 934 and the track record is updated 932 to reflect the termination. Otherwise the coasting track 930 updates the track record 932. There is a limit on how many frames a track is allowed to be in coasting status. In this example the coasting limit was set at 2 frames. That is, if a match is not found for more that two frames, the track would be terminated 934. In addition, new tracks, in this example those that have a current track length of 1, are not allowed to coast since they are more likely to be spontaneous noisy spikes in the horizontal edge-projection, rather than from real overhead objects.

The updated track record 932 is searched for any unmatched existing tracks 936, if there are unmatched existing tracks 936 then the invention gets the next track 908. Conversely, if there are no unmatched existing tracks 936 and there are more unmatched candidates 938, new tracks are created 940, sorted 942, and the process is finished. If there are no more unmatched candidates 938 the tracks are sorted 942 and the process is finished. Once all current tracks have been considered for possible continuation through matching, if there are any candidates left in the segmented horizontal edge-projection, new tracks are initiated at these locations.

With the exception of coasting tracks, the location for the continuing and the new tracks in the current frame is their location in the horizontal edge-projection, compensated by the motion estimated 914 for the current frame. This allows the track locations to retain the sub-pixel resolution capability promised by the motion estimate. In addition, a 'track-point strength' is defined for the point as the value of the original horizontal edge-projection at the location where the match is found. All tracks, new or continuing, will be updated to include the new track point. A track record contains a vector of floating-point numbers in image row coordinates representing the location of the track over a number of consecutive image frames. The track record also contains a companion vector of traveled distance since the beginning of the track, which can be computed by integration of the speed of the vehicle over the elapsed time.

All of the updated tracks are sorted 942 based on the criteria set forth below. Preference is given to long and strong tracks, so that real tracks have a better chance to survive and noisy tracks can be suppressed. This is achieved by selecting the tracks in a pre-sorted order when considering the next current tracks 908 for continuation during the matching phase. The sorting 942 is done based on the following criteria in the order given:

1. The length of the track in terms of the number of image frames the track spans;
2. The strength of the track measured by the average strength of the track points; and
3. The status of the track in the order of current, coast, and new track.

Once a horizontal edge-projection track is established, the underlying object's height and the distance to the host vehicle can be estimated. A method to achieve this has been developed. It is required that the camera's focal length, f, be known. The assumptions for the method are:

1. The vehicle has been traveling substantially straight on a mostly flat surface, and
2. The camera's optical axis is parallel to the ground plane in which the vehicle travels, and passes through the center of the image.

To estimate the object height and distance, the following set of equations are established for the points in a horizontal edge-projection track using a one-dimensional imaging model:

$$y_i = \frac{fH}{Z_i} \quad i = 0, \ldots, N-1, \tag{1}$$

where $y_i$ is the track point's Y coordinate (the Y axis points up) at frame i, H is the underlying object's height above the camera, $Z_i$ is the distance of the object to the host vehicle at frame i, and N is the number of points in the track, or the length of the track. Letting $r_i$ be the track location for frame i, $y_i$ can be written as:

$$y_i = Y_0 - r_i, \tag{2}$$

where $Y_0$ is the reference horizon in the image, usually corresponding to the middle image row and obtained through calibration. Let $d_i$ be the distance the host vehicle has traveled from frame 0 ($d_0=0$). $Z_i$ can be expressed in terms of $d_i$ and D, the distance of the host vehicle at frame 0 to the object as:

$$Z_i = D - d_i. \tag{3}$$

Substituting equations (2) and (3) into equation (1):

$$(Y_0-r_i)D-fH=(Y_0-r_i)d_i, \quad i=0, \ldots, N-1 \tag{4}$$

or:

$$A \begin{bmatrix} D \\ H \end{bmatrix} = B, \tag{5}$$

where the matrix A (N by 2) and the column vector B (size N) are made up of coefficients in equation (4):

$$A = [(a_0), (a_1), \ldots, (a_{n-1})]^T a_i = [Y_0-r_i, -f]^T = [y_i, -f]^T,$$
$$i = 0, \ldots, N-1$$

$$B = [b_0, b_1, \ldots, b_{n-1}]^T b_i = (Y_0-r_i)d_i = y_i d_i, \quad i=0, \ldots, N-1, \tag{6}$$

where $Y_0$ is given, and since $r_i$ the track location, and $d_i$ the travel distance, are known, then it is possible to solve for D and H using a least-squares method for the over-determined system for N>2:

$$\begin{bmatrix} \hat{D} \\ \hat{H} \end{bmatrix} = (A^T A)^{-1} A^T B. \tag{7}$$

As a measure of the quality of the parameter estimation, an error is defined as:

$$e = \sqrt{\frac{1}{N} \sum e_i^2}, \; e_i y_i - \frac{fH}{Z_i} = Y_0 - r_i - \frac{f\hat{H}}{\hat{D}-d_i}, \; i=0, \ldots, N-1, \tag{8}$$

where $e_i$ is the error of the track location ($y_i$) with respect to the re-projected location ($f\hat{H}/(\hat{D}-d_i)$) using the estimated parameters.

Figure 10:
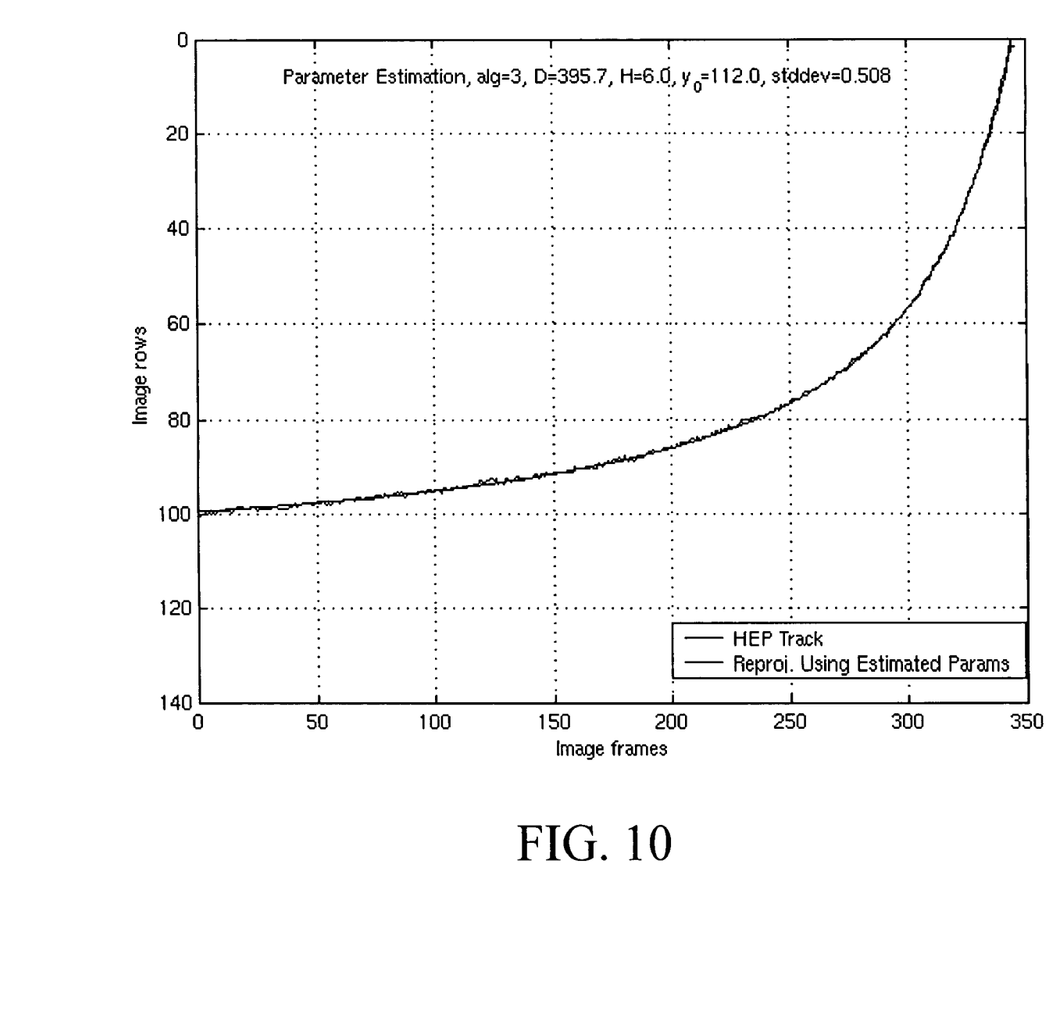
FIG. 10 is a sample horizontal edge-projection track and the re-projected trajectory using the estimated object parameters.

Equation 7 gives very good results when the amount of noise is reasonable, as shown in FIG. 10. In this example, $d_i$, the distance that the host vehicle has traveled since the beginning of the track, is computed by integrating the vehicle speed over the time span of the track.

As the system identifies and tracks the horizontal line segments as discussed in previous sections, the object parameters need to be estimated to determine whether the horizontal lines do indeed come from an overhead object. The track information is substituted into the equations developed above to find the distance and height of the underlying object. A number of reasons can cause this approach to fail. The main issue is the noise in the estimated track position. Inaccuracies in vertical motion estimation can also cause the parameter estimation to provide incorrect results. Constraints have been developed to help ensure the results of the parameter estimation to be more robust and reliable. The constraints include using tracked horizontal edge-projections near and above the reference horizon for parameter estimation. Doing so eliminates most of the noisy tracks caused by the real horizon, shadows cast on the ground by overhead objects, and the vehicles on the road. This window, for example, may be set to be from row 1 to 140, the bottom of which corresponds to a nominal $Y_0$ of the 120 plus 20 pixels of margin for an image of 240 rows. A second constraint includes utilizing a lower limit to set the number of frames, and the tracked horizontal edge-projection has a duration such that it can be used for parameter estimation. Shorter tracks are not considered established, and therefore are deemed less reliable. In this example, for this reason, this threshold is set to 20 frames. A third constraint requires that tracks have sufficient apparent change or movement in the Y direction. When an object is far away from the vehicle, the resulting track's position does not change significantly over a relatively long sequence of images. These tracks will be relatively flat, and impose little constraint to the parameter estimation. As a result, the quality of parameter estimation is very poor and the results are often dominated by the noise present in the track. Ignoring such tracks is safe since the object is far away. To enforce this requirement, the difference between the locations of the last and the first track points is checked to ensure that this difference exceeds a set threshold. In one example this threshold was set at 10 pixels. A fourth constraint is an estimated parameter abnormality test. For example the results of distance and height are checked for values less than zero, and the corresponding tracks are ignored. For the remaining non-zero tracks, the standard deviation of the error vector "e" in equation (8) is checked to see if it is a reasonably small value. This will ensure the estimated parameters fit well within the track points.

The overhead object identification is developed to help reduce false alarms from a radar sensor for collision warning purposes. Once the parameters of the horizontal edge-projection tracks have been estimated, the objects that correspond to the individual overhead objects will be grouped based on the estimated distance from each track. Within such a group, the lowest track, which is often the one with the smallest estimated height value, determines the lower reach of the object. This track information, combined with the results from the vehicle radar system, will help determine if the reported objects come from an overhead object, or a stopped vehicle. Once it is determined that the object is an overhead object, the information is combined with objects that are determined to be a potential threat by the radar.

Radar reports, which include object distance, speed relative to the host vehicle, and object angle relative to the vehicle longitudinal axis, need to be separated into those that are a potential threat and those that are not. The radar reports are first classified into moving and fixed objects. This is achieved by comparing the measured object speed with that of the host vehicle. The fixed objects are further classified into in-lane versus out-of-lane objects by examining their lateral distance to the center of the host path. The objects that are within a certain range (in this example 6 meters, 3 meters on each side which is adjusted to adapt to actual lane width or other constraint) around the host path are considered in-lane. Only those radar reports that are classified as "fixed" and "in-lane" are compared with the overhead object information.

The last step in the fusion process is comparing the distance of the overhead object with the fixed in-lane reports from the radar. The estimated distances from all overhead objects belonging to a group are averaged to find the average distance to the object. This distance is then compared with those of in-lane fixed objects. If the distance of an in-lane fixed object is within 10 meters of the averaged distance of the overhead object, the fixed in-lane radar report is classified as from the overhead object, and declared not a threat. Alternatively objects that are "fixed" and "in-lane" and have been determined not to be a non-hazardous overhead structure are considered a threat to the host.

What is claimed is:

1. An identification method comprising acts of:
   receiving an input image sequence;
   isolating stationary objects from the input image sequence, wherein the act of isolating further includes acts of:
      generating a horizontal edge projection from the input image sequence;
      estimating a vertical motion from the input image sequence;
      estimating an object parameter of the stationary objects from the horizontal edge projection and the vertical motion;
   receiving a radar signal;
   classifying objects within the radar image as moving or non-moving objects; and
   comparing the non-moving objects from the radar image with the object parameter of the stationary objects, wherein non-moving objects outside of a given object parameter are classified as a non-threat, and non-moving objects within a given object parameter are classified as a threat.

2. The method of claim 1, wherein the act of estimating an object parameter further includes an act of estimating a distance to and a height of the stationary object.

3. The method of claim 2, wherein the act of isolating stationary objects further comprises an act of isolating overhead stationary objects.

4. The method of claim 2, the act of estimating a distance to and a height of the stationary object further comprises acts of:
   establishing a horizontal edge projection track from the horizontal edge projection;
   calculating a first coordinate of the horizontal edge projection track $y_i$ utilizing a first equation $$y_i = \frac{fH}{Z_i},$$

where $i=0, \ldots, N-1$, H is the height of the stationary object above a predetermined point, $Z_i$ is the distance of the stationary object to the predetermined point at frame i, and N is the number of points in the horizontal edge projection track;
   calculating $y_i$ using a second equation
   $y_i = Y_0 - r_i$, where $r_i$ is a location of the horizontal edge projection track for frame i, and $Y_0$ is a reference horizon;
   calculating $Z_i$ utilizing a third equation $Z_i = D - d_i$, where D is a distance between the stationary object and the predetermined point when $i=0$ and $d_i$ is the distance the predetermined point has traveled from $i=0$ to $i=i$;
   substituting the second equation and the third equation into the first equation resulting in a fourth equation $(Y_0 - r_i)D - fH = (Y_0 - r_i)d_i$, where $i=0, \ldots, N-1$ rewriting the fourth equation as a matrix A, where the matrix A (N by 2) and a column vector B (size N) are made up of the coefficients in the fourth equation, $$A\begin{pmatrix} D \\ H \end{pmatrix} = B$$

$$A = [(a_0), (a_1), \ldots, (a_{n-1})]^T a_i = [Y_0 - r_i - f]^T = [y_i, f]^T,$$

$$i = 0, \ldots, N-1$$

$$B = [b_0, b_1, \ldots, b_{-1}]^T b_i = (Y_0 - r_i)d_i = y_i d_i, i = 0, \ldots, N-1$$

solve matrix A for D and H using a least-squares method.

5. The method of claim 4, wherein the act of isolating stationary objects further comprises an act of isolating overhead stationary objects.

6. An identification system comprising:
a host vehicle, wherein the host vehicle comprises:
  an image capture device, operatively interconnected with;
  an image signal processor, operatively interconnected with;
  a matching processor, operatively interconnected with;
  a radar transceiver,
  wherein the image signal processor further comprises:
    a horizontal edge projection generator for generating a horizontal edge projection from an input image;
    a vertical motion estimator for estimating a vertical motion from the input image;
    an object parameter estimator for estimating an object parameter from the horizontal edge projection and the vertical motion,
  wherein when the image capture device receives an input image sequence, the image signal processor isolates stationary objects from the input image sequence and provides an object parameter, the radar transceiver classifies objects within the radar image as moving or non-moving objects, and the matching processor compares the non-moving objects with the object parameter, wherein non-moving objects outside of a given parameter are classified as a non threat, and non-moving objects within a given object parameter are classified as a threat.

7. The system of claim 6, wherein the object parameter is distance and height of the stationary object.

8. The system of claim 6, wherein stationary objects are overhead stationary objects.

9. The system of claim 6, wherein the matching processor has computer further instructions for performing the operations of:
  establishing a horizontal edge projection track from the horizontal edge projection;
  calculating a first coordinate of the horizontal edge projection track $y_i$ utilizing a first equation $$y_i = \frac{fH}{Z_i},$$

where i=0, ..., N−1, H is the height of the stationary object above a predetermined point, $Z_i$ is the distance of the stationary object to the predetermined point at frame i, and N is the number of points in the horizontal edge projection track;
  calculating $y_i$ using a second equation
  $y_i = Y_0 - r_i$, where $r_i$ is a location of the horizontal edge projection track for frame i, and $Y_0$ is a reference horizon;
  calculating $Z_i$ utilizing a third equation
  $Z_i = D - d_i$, where D is a distance between the stationary object and the predetermined point when i=0 and $d_i$ is the distance the predetermined point has traveled from i=0 to i=i;
  substituting the second equation and the third equation into the first equation resulting in a fourth equation $$(Y_0 - r_i)D - fH = (Y_0 - r_i)d_i, \text{ where } i=0, \ldots, N-1$$

rewriting the fourth equation as a matrix A, where the matrix A (N by 2) and a column vector B (size N) are made up of the coefficients in the fourth equation, $$A\begin{pmatrix} D \\ H \end{pmatrix} = B$$

$$A = [(a_0), (a_1), \ldots, (a_{n-1})]^T a_i = [Y_0 - r_i - f]^T = [y_i, f]^T,$$

$$i = 0, \ldots, N-1$$

$$B = [b_0, b_1, \ldots, b_{-1}]^T b_i = (Y_0 - r_i)d_i = y_i d_i, i = 0, \ldots, N-1$$

solve matrix A for D and H using a least-squares method.

10. The method of claim 9, wherein the stationary objects are overhead stationary objects.

\* \* \* \* \*